US008743443B2

(12) United States Patent
Kumasawa et al.

(10) Patent No.: US 8,743,443 B2
(45) Date of Patent: Jun. 3, 2014

(54) HOLOGRAM FABRICATION PROCESS, AND HOLOGRAM FABRICATED BY THAT PROCESS

(75) Inventors: Tomoko Kumasawa, Shinjuku-ku (JP); Makio Kurashige, Shinjuku-ku (JP); Mitsuru Kitamura, Shinjuku-ku (JP); Masachika Watanabe, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/513,462

(22) PCT Filed: Nov. 12, 2007

(86) PCT No.: PCT/JP2007/071886
§ 371 (c)(1),
(2), (4) Date: May 4, 2009

(87) PCT Pub. No.: WO2008/059779
PCT Pub. Date: May 22, 2008

(65) Prior Publication Data
US 2010/0073745 A1   Mar. 25, 2010

(30) Foreign Application Priority Data

Nov. 13, 2006 (JP) .................. 2006-306478
Nov. 13, 2006 (JP) .................. 2006-306501
Dec. 6, 2006 (JP) .................. 2006-329006

(51) Int. Cl.
*G03H 1/28* (2006.01)

(52) U.S. Cl.
USPC ............................................. 359/24

(58) Field of Classification Search
USPC .................. 359/10, 11, 3, 21, 2, 24, 35
See application file for complete search history.

(56) References Cited

U.S. PATENT DOCUMENTS 6,445,470 B1 * 9/2002 Jenkins et al. .................. 359/11
6,730,442 B1 * 5/2004 Sutherland et al. ............. 430/1

FOREIGN PATENT DOCUMENTS

JP    6-118234 A    4/1994
JP    6-281933 A   10/1994
(Continued)

OTHER PUBLICATIONS

Mitsuru Kitamura, et al., "Image-type CGH by means of e-beam printing (3)-enhancement of 3-D effect with hidden surface removal and shading-", (with English Abstract).

(Continued)

*Primary Examiner* — Jennifer L. Doak
(74) *Attorney, Agent, or Firm* — Sughrue Mion, PLLC

(57) ABSTRACT

The invention provides a hologram fabrication process, characterized by comprising steps of fabricating a computer-generated hologram (CGH) having amplitude information and phase information recorded by computer operation on a given recording surface, irradiating the computer-generated hologram (CGH) with the first reconstructing illumination light (2) to generate the first diffracted light (3) from the computer-generated hologram (CGH) thereby reconstructing a first reconstruction image (O'), simultaneously entering the first diffracted light (3) and the first reference light (4) in a first-stage hologram recording material (11) faced away from the first reconstructed image to record a first-stage hologram (11) in it, irradiating the recorded first-stage hologram (11) with the second reconstructing illumination light (5) to generate the second diffracted light (6) from the first-stage hologram (11) thereby reconstructing the second reconstruction image (O"), and simultaneously entering the second diffracted light (6) and the second reference light (7) in a second-stage hologram recording material (21) located near the second reconstructed image (O") to record the second-stage hologram (21) in it as a reflection or transmission type volume hologram.

7 Claims, 12 Drawing Sheets

(56) References Cited

FOREIGN PATENT DOCUMENTS

| | | | |
|---|---|---|---|
| JP | 8-75925 | A | 3/1996 |
| JP | 11-231762 | A | 8/1999 |
| JP | 2000-214751 | A | 8/2000 |
| JP | 2002-072837 | A | 3/2002 |
| JP | 2004-94202 | A | 3/2004 |
| JP | 2005-215570 | A | 8/2005 |

OTHER PUBLICATIONS

Japanese Office Action dated Mar. 14, 2012.

* cited by examiner (a)

(b)

(a)

(b)

(a)

(b)

(a)

(b)

HOLOGRAM FABRICATION PROCESS, AND HOLOGRAM FABRICATED BY THAT PROCESS

ART FIELD

The present invention relates generally to a hologram fabrication process and a hologram fabricated by that process, and more particularly to a process for the fabrication of a volume hologram in which a reconstructed image of a computer-generated hologram (CGH) is recorded, and a hologram fabricated by that process.

So far, tradable coupons, credit cards or the like having holograms on or in them have been known for the purpose of preventing forgery. One such hologram is a computer-generated hologram fabricated by forming interference fringes on a given recording surface by computer operation (Patent Publication 1).

Patent Publication 1: JP(A) 2000-214751
Patent Publication 2: JP(A) 2002-72837
Patent Publication 3: JP(A) 2005-215570
Non-Patent Publication 1: "99-3D Image Conference '99", a CD-ROM version of lecturing monographs (at the Shinjuku schoolhouse, Kogakuin University), an article entitled "Image-type CGH by means of e-beam printing (3)—Enhancement of 3-D effect with hidden surface removal and shading—"

DISCLOSURE OF THE INVENTION

Problem to be Solved by the Invention

However, the above prior art computer-generated hologram proposed so far in the art is a relief hologram that is easier to forge than a volume hologram and so inferior in security, although it is practical in design and security aspects.

Having been made in view of such problems with the prior art, an object of the invention is to provide a simple process for the fabrication of a hologram that is much more improved in terms of design and security and a hologram fabricated by that process.

Means for Solving the Problem

According to the invention, the above object is accomplishable by the provision of a hologram fabrication process comprises steps of fabricating a computer-generated hologram having amplitude information and phase information recorded by computer operation on a given recording surface, irradiating said computer-generated hologram with first reconstructing illumination light to generate first diffracted light from said computer-generated hologram thereby reconstructing a first reconstruction image, simultaneously entering said first diffracted light and first reference light in a first-stage hologram (H1) recording material located near said first reconstructed image to record a first-stage hologram in it, irradiating the recorded first-stage hologram with second reconstructing illumination light to generate second diffracted light from said first-stage hologram thereby reconstructing a second reconstruction image, and simultaneously entering said second diffracted light and second reference light in a second-stage hologram (H2) recording material located near said second reconstructed image to record a second-stage hologram in it as a reflection or transmission type volume hologram.

It is desired that the first-stage hologram recording material be located such that zero-order light of said first reconstructing illumination light is not incident to it or, alternatively, the second-stage hologram recording material be located such that zero-order light of said second reconstructing illumination light is not incident to it.

It is desired that a computer-generated hologram fabricated by use of object light that spreads out from a point light source set on a recording object in a given one-dimensional direction only be used as said computer-generated hologram, and when recording said first-stage hologram, diffusing illumination light that diffuses in a direction orthogonal to said one-dimensional direction be used as said first reconstructing illumination light.

It is desired that a computer-generated hologram fabricated by use of object light that spreads out from a point light source set on a recording object in a given one-dimensional direction only be used as said computer-generated hologram, and when recording said first-stage hologram, a unidirectional diffusing means for diffusing light in only a direction orthogonal to said one-dimensional direction be located near said computer-generated hologram on said first-stage hologram recording material side.

It is desired that a computer-generated hologram fabricated by use of object light that spreads out from a point light source set on a recording object in a given one-dimensional direction only be used as said computer-generated hologram, and when recording said second-stage hologram, a unidirectional diffusing means for diffusing light in only a direction orthogonal to said one-dimensional direction be located near said second-stage hologram on said first-stage hologram recording material side.

It is desired that said first reconstructing illumination light, with which said computer-generated hologram is irradiated, come in from said one-dimensional direction.

A computer-generated hologram capable of reconstructing a full-color image under white light may be used as said computer-generated hologram. In this case, the wavelength of said first reconstructed illumination light is varied in order when fabricating said first-stage hologram so that a plurality of first-stage holograms are fabricated corresponding to the respective wavelengths. Then, when fabricating said second-stage hologram, the plurality of first-stage holograms corresponding to the respective wavelengths are interchanged and irradiated with the second reconstructing illumination light having corresponding wavelengths so that the holograms corresponding to the respective wavelengths are multi-recorded in a second-stage hologram recording photosensitive material in a one layer form, or the holograms corresponding to the respective wavelengths are recorded in a second-stage hologram recording photosensitive material in separate layers form corresponding to the respective wavelengths.

The inventive hologram fabrication process is further characterized by comprising steps of fabricating a computer-generated hologram in which amplitude information and phase information are recorded by computer operation on a given recording surface, irradiating said computer-generated hologram with reconstructing illumination light to generate diffracted light from said computer-generated hologram thereby reconstructing a reconstruction image, and simultaneously entering said diffracted light and reference light in a hologram recording material so that a reflection or transmission type volume hologram is recorded in it.

It is desired that said reconstruction image be reconstructed at a position away from said computer-generated hologram, and said hologram recording material be located near said reconstruction image.

It is desired that the said hologram recording material be located such that zero-order light of said reconstructing illumination light is not incident to it.

It is desired that a computer-generated hologram recorded by use of object light that spreads out from a point light source set at a recording object in a given one-dimensional direction only be used as said computer-generated hologram, and a unidirectional diffusion means for diffusing incident light in only a direction orthogonal to said one-dimensional direction be near said computer-generated hologram side of said hologram recording material near said reconstruction image.

It is desired that a computer-generated hologram capable of reconstructing a full-color image under white light be used as said computer-generated hologram, and the wavelength of reconstructing illumination light is varied in order so that the computer-generated hologram is multi-recorded in said hologram recording material in a one layer form or a plurality of hologram layers having different wavelengths, recorded in separate hologram recording materials for each wavelength of reconstructing illumination light, are stacked together into a hologram capable of reconstructing two or more wavelengths.

Further, the invention includes holograms fabricated by the above hologram fabrication processes.

Advantages of the Invention

According to the invention, volume holograms excelling in design and security can be fabricated by simple processes. It is also possible to eliminate or reduce noises from such holograms. Further, the computer-generated hologram is irradiated with the first reconstructing illumination light that diffuses in the direction orthogonal to the one-dimensional direction where the object light spreads out upon the recording of the computer-generated hologram, so that there can be a vision area wider in the direction orthogonal to the one-dimensional direction where the object light spreads out. It is here noted that if the first reconstructing illumination light, with which the computer-generated hologram is irradiated, is allowed to come in from that one-dimensional direction, it is then possible to prevent the zero-order light and the primary light from being put one upon another even at an increased angle of diffusion, thereby eliminating or reducing noises. It is also possible to fabricate a hologram capable of reconstructing two or more wavelengths: it is possible to achieve a lot more enhanced security or aesthetic design. Furthermore, it is possible to reduce the number of steps of fabricating conventional H1 holograms when fabricating volume holograms.

BEST MODE FOR CARRYING OUT THE INVENTION

How to fabricate the hologram here is now explained with reference to the accompanying drawings.

Figure 1:
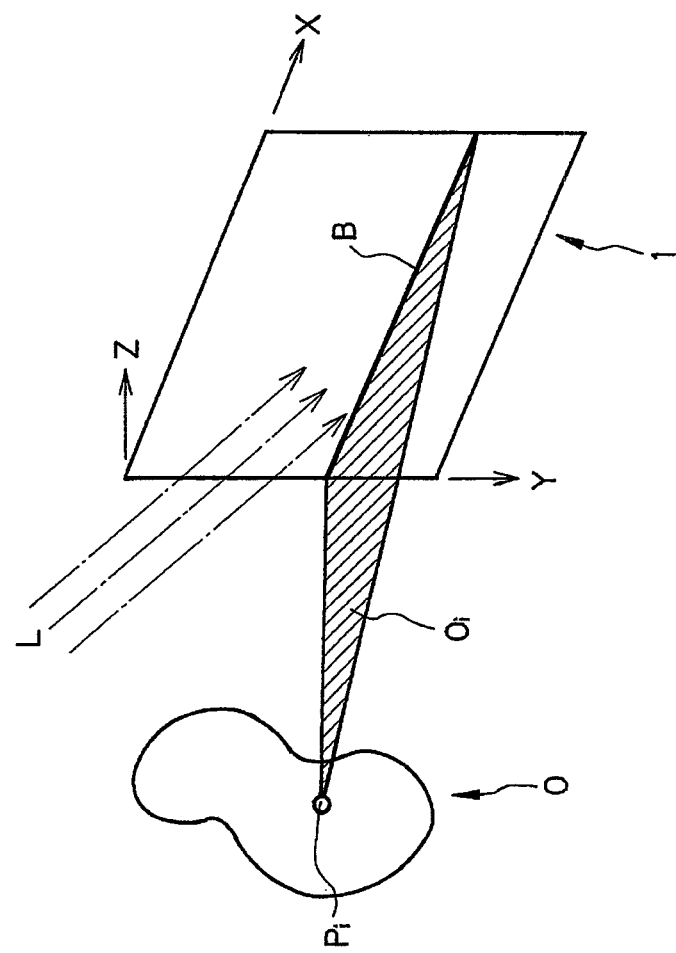
FIG. 1 is illustrative in concept and perspective of how to record a computer-generated hologram according to the invention.
Figure 2:
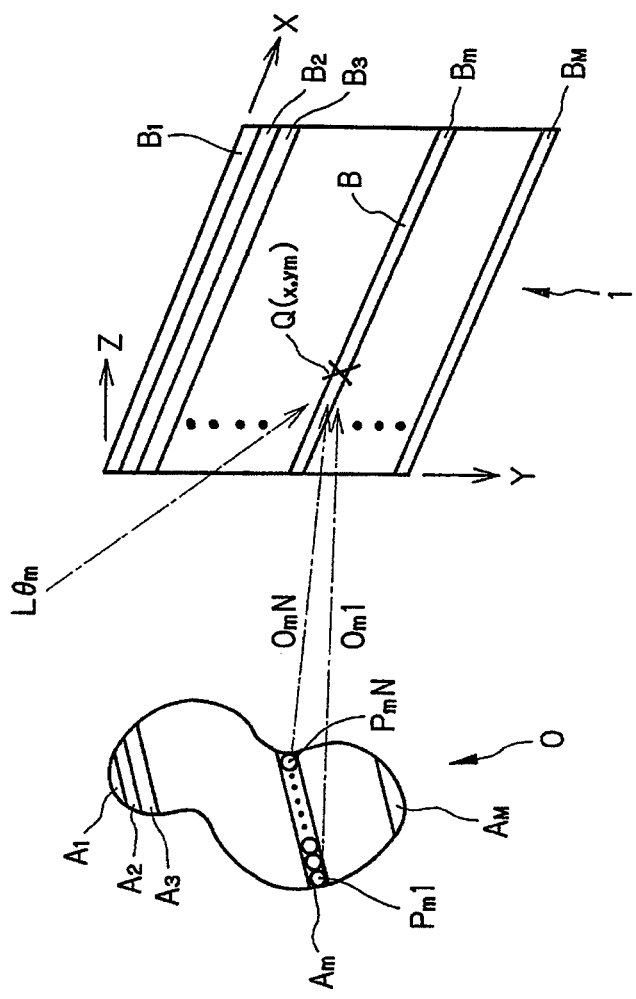
FIG. 2 is illustrative of an example embodied on the concept of operation in FIG. 1.
Figure 3:
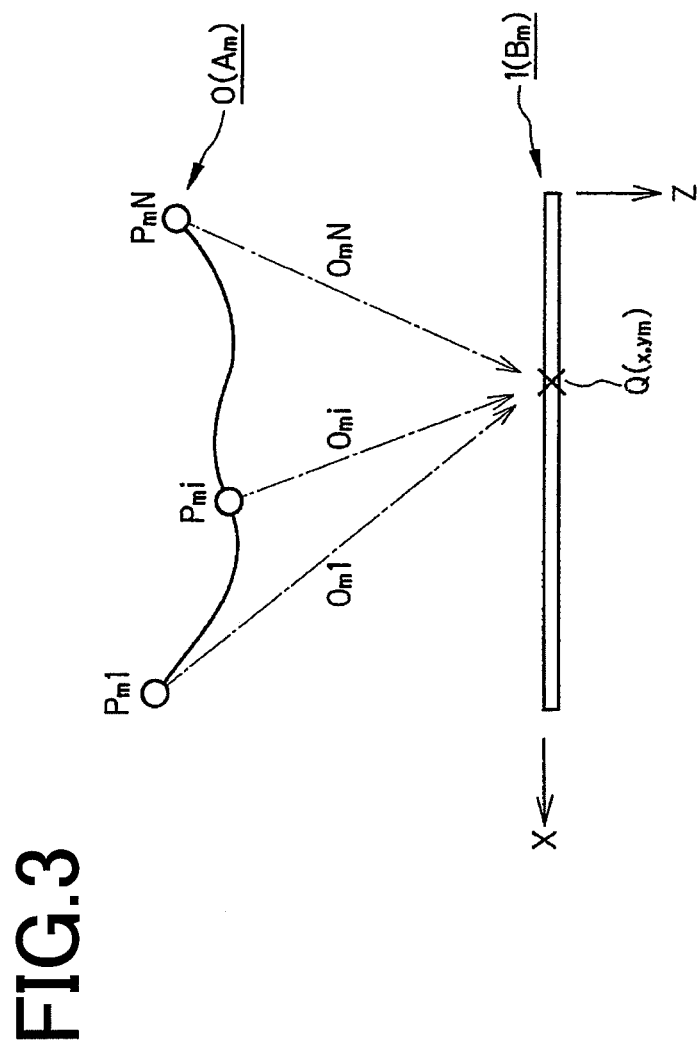
FIG. 3 is a top view illustrative of the concept of operation.

In the embodiment here, a computer-generated hologram 1 is first fabricated. FIGS. 1, 2 and 3 are illustrative of how to fabricate the computer-generated hologram 1.

First, there is a computer-generated hologram used, which is recorded by use of object light that spreads out from a point light source set on the object to be recorded in a given one-dimensional direction. This fabrication process is based on what is set forth in Patent Publication 1. That is, as shown in FIG. 1, suppose here that object light Oi radiating from any point light source Pi on an original image O spread out in the horizontal direction only (within a plane parallel with the XZ plane). The object light Oi will arrive at a linear area B only on a recording medium 1, whereas the object light Oi will not reach the rest of the recording medium 1 at all. When holograms are produced by an optical method, it is very difficult to limit such spreading of the object light; however, if a hologram is produced on a computer, the object light is easily controllable by mere correction of an operation formula. Therefore, similar limitation (that object light spreads out within only a plane parallel with the XZ plane) is imposed on object light radiating from all point light sources forming the original image O.

FIG. 2 is a perspective view of an example of how to record the computer-generated hologram based on the above basic concept. In the example here, the original image O and the recording medium 1 (recording surface) are each divided by a multiplicity of parallel planes in the horizontal direction to define a multiplicity of linear unit areas. More specifically, the original image O is divided into a total of M unit areas A1, A2, A3, . . . Am, . . . , AM, and the recording medium 1 is divided into a total of M unit areas B1, B2, B3, Bm, BM, too. When the original image O is a three-dimensional one, the respective unit areas A1, A2, A3, . . . , Am, . . . , AM are defined by dividing the surface portion of this solid body. The M unit areas on the original image O and the M unit areas on the recording medium 1 have one-to-one relations the way the m-th unit area Am on the original image O is corresponding to the m-th unit area Bm on the recording medium 1.

In the example of FIG. 2, it is noted that each of the unit areas A1, A2, A3, . . . , Am, . . . , AM has a width set equal to the Y-direction pitch of point light sources defined on the original image O, and the individual unit areas each define a linear area where the point light sources are lined up in a row. In the example shown, for instance, N point light sources Pm1 to PmN are lined up in a row on the m-th unit area Am. Each of the unit areas B1, B2, B3, . . . , Bm, . . . , BM has a width set equal to the Y-direction pitch of points of computation defined on the recording medium 1, and the individual unit areas each define a linear area where the points of computation defined on the recording medium 1 are lined up in a row. The point of computation Q(x, ym) shown is indicative of one positioned in the m-th unit area Bm, and lies at a position indicated by a coordinate value (x, ym) in an XY coordinate system.

In this example, the interference wave intensity of the point of computation Q(x, ym) is found as follows. First, the unit area Am on the original image O corresponding to the unit area Bm to which that point of computation Q(x, ym) belongs is determined as the unit area to which computation is to be applied. And if the amplitude intensity at the position of the point of computation Q(x, ym) of an interference wave formed by object light Om1 to OmN coming out of the point light sources Pm1 to PmN in the unit area to be computed and reference light L$\theta$m is determined, that then gives the interference wave intensity of the desired point of computation Q(x, ym). The reference light L$\theta$m here is a monochromatic parallel ray parallel with, for instance, the YZ plane, and is incident on the recording medium 1 at the same angle irrespective of position. Alternatively, the angle of incidence $\theta$m of the reference light L$\theta$m may be determined on the basis of the setting of virtual illumination and a virtual visual point; for instance, it may be set such that the angle of incidence $\theta$1 of reference light L$\theta$1 on the unit area B1 at the uppermost end becomes a larger angle $\delta$, and the angle of incidence $\theta$M of reference light L$\theta$M on the unit area BM at the lowermost end becomes a smaller angle $\beta$.

FIG. 3 is a top view of the concept of such computation, which is illustrative of the original image O and the recording medium 1 for the master plate of CGH of FIG. 2, as viewed from above. As shown, the object light necessary to determine the interference wave intensity at the point of computation Q(x, ym) is limited to only object light Om1, . . . , Omi, . . . , OmN given out of N point light sources Pm1, . . . , Pmi, . . . , PmN within the unit area Am to be computed: there is no need of taking care of object light coming from all point light sources forming the original image O. Thus, if the given interference wave intensities are determined of all the points of computation Q(x, ym) defined on the recording medium 1 for the master plate of CGH, there is then an intensity distribution of interference waves obtained on the recording medium 1 for the master plate of CGH: there is a master plate of CGH 1 obtained. Note here that the recording medium for the master plate of CGH and the master plate of CGH are indicated by the same reference numeral 1.

With reference to FIGS. 1, 2 and 3, there has been the mention of how to record information about the light sources on the m-th unit area Am defined on the original image O on the m-th unit area Bm defined on the recording medium 1 for the master plate of CGH. In the model described with reference to this method, the unit areas Am and Bm are each a geometrically linear area, and all the point light sources, and all the points of computation are lined up unidimensionally.

While the amplitude and phase of the object light at the points of computation Q on the divided areas are recorded by the interference fringes resulting from interference with the reference light as described above, it is here understood that the phase and amplitude may otherwise be recorded by the phase and width of grooves in one surface of a three-dimensional cell as shown in Patent Publications 2 and 3.

Alternatively, the amplitude and phase may be recorded by the method of A. W. Lohmann et al., the method of Lee, etc.

In any case, the master plate of CGH 1 used here is a computer-generated hologram recorded by use of object light that spreads out from the point light source set on the object to be recorded in the given one-dimensional direction only.

Figure 4:
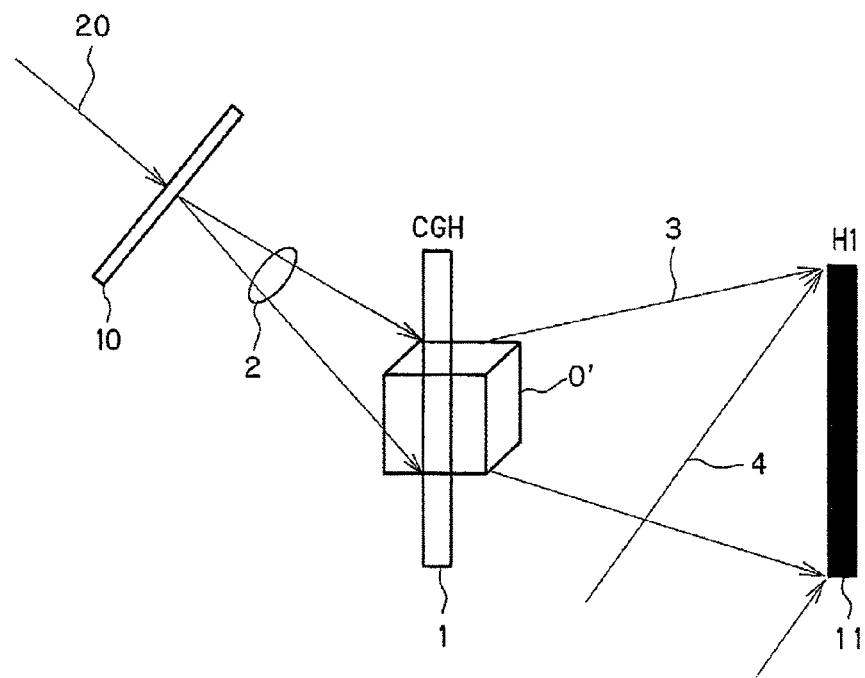
FIG. 4 is illustrative of the first embodiment for the process of fabricating a volume hologram based on the invention.
Figure 4:
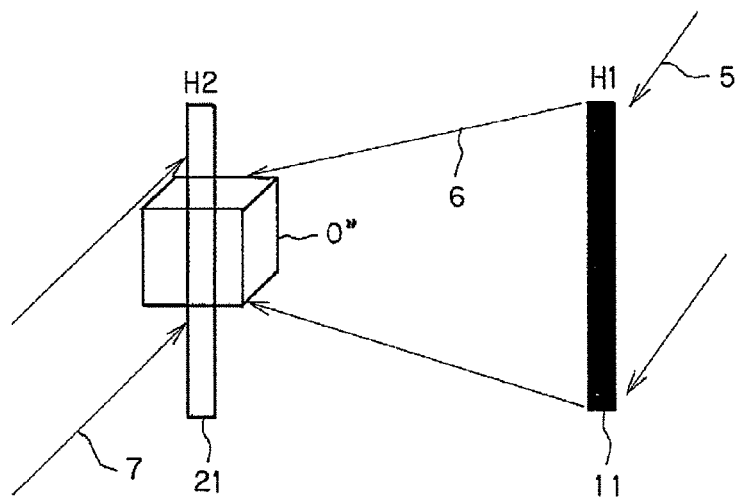

How to fabricate the volume hologram based on the invention from the thus obtained master plate of CGH 1 recorded by use of the object light that spreads out in the given one-dimensional direction only is now explained with reference to the first embodiment shown in FIG. 4. FIG. 4(a) is illustrative of a holographic recording arrangement for fabricating the first-stage H1 hologram 11 from the master plate of CGH 1, and FIG. 4(b) is illustrative of a holographic recording arrangement for fabricating the second-stage H2 hologram 21 from the first-stage H1 hologram 11.

First of all, to fabricate the first-stage H1 hologram 11 from the master plate of CGH 1, an H1 hologram recording photosensitive material 11 such as a photopolymer or silver halide material is faced away from the master plate of CGH 1. Then, the master plate of CGH 1 is irradiated with the first reconstructing illumination light 2. However, it is here noted that diffusing illumination light that diffuses at a given angle in a vertical direction orthogonal to the one-dimensional direction is used for the first reconstructing illumination light 2 with which the master plate of CGH1 is irradiated, because the computer-generated hologram 1 shown in FIGS. 1, 2 and 3 has a visual area that is wider in a horizontal direction defining the one-dimensional direction in which the light from the point light sources spreads out upon holographic recording than in the vertical direction orthogonal to that one-dimensional direction. To this end, a uni-directional diffuser 10 acting as a unidirectional diffusing means such as a lenticular sheet or a hologram to diffuse object light in the vertical one-dimensional direction only is located in an optical path taken by parallel illumination light 20 adapted to illuminate the master plate of CGH 1 to generate the first reconstructing illumination light 2 defined by the diffusing illumination light diffusing in the vertical direction. Then, that first reconstructing illumination light 2 is directed to the master plate of CGH 1 at a given angle of incidence from an opposite side to the H1 hologram recording photosensitive material 11 to generate the first diffracted light 3 from the master plate of CGH 1 so that the first reconstruction image O' of the original image O is reconstructed, and that first diffracted light 3 is entered in the H1 hologram recording photosensitive material 11. FIG. 4(a) shows that the first reconstruction image O' is supposed to be reconstructed near the master plate of CGH 1; however, such a reconstruction position is not necessarily limited to near the master plate of CGH 1. Then, that first diffracted light 3 and the first reference light 4 that is coherent with the first diffracted light 3 and comprises parallel light from the same light source are simultaneously entered at an angle of incidence $\theta$ on the surface of the H1 hologram recording photosensitive material 11 to expose a hologram of the first reconstruction image O' to the H1 hologram recording photosensitive material 11. In this case, it is preferable to prevent the zero-order light (that transmits through the master plate of CGH 1 without undergoing diffraction) of the first reconstructing illumination light 2 from overlapping the H1 hologram recording photosensitive material 11 and scattered light (different from the diffusing illumination light) from the unidirectional diffuser 10 from entering the H1 hologram recording photosensitive material 11 through the master plate of CGH 1, because noises are reduced. Finally, the H1 hologram recording photosensitive material 11 with the hologram exposed to light is post treated to fabricate the H1 hologram 11. Here, the H1 hologram recording photosensitive material and the H1 hologram are indicated by the same reference numeral 11.

Figure 5:
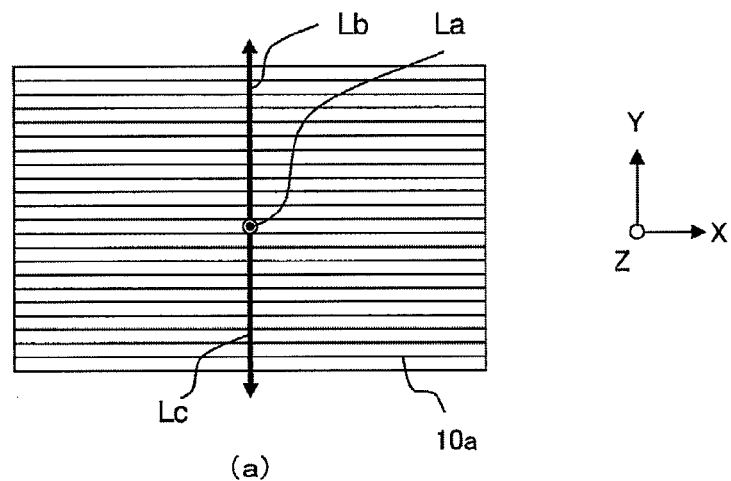
FIG. 5 is illustrative of a lenticular sheet working as unidirectional diffuser means.
Figure 5:
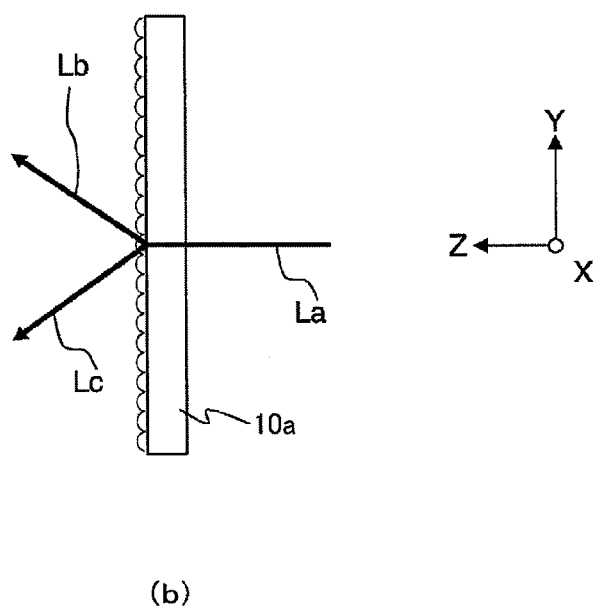

FIG. 5 is illustrative of a lenticular sheet 10a acting as such unidirectional diffuser means as described above. FIG. 5(a) is a front view of the lenticular sheet 10a, and FIG. 5(b) is a sectional view of the lenticular sheet 10a. With coordinate axes defined as shown in FIGS. 5(a) and 5(b), incident light La that is incident on the lenticular sheet 10a from the Z-axis minus direction is diffused through the lenticular sheet 10a in the Y-axis direction between exit light Lb and Lc, leaving the lenticular sheet 10a. As such unidirectional diffuser 10 is located in the optical path taken by parallel illumination light 20 to enter the vertically diffusing, first diffracted light 3 in the master plate of CGH 1, it causes the first diffracted light 3 to spread out in the vertical direction depending on its angle of diffusion, too, so that the vertical visual area of the hologram recorded in the H1 hologram can grow wide.

Then, as shown in FIG. 4(b), an H2 hologram recording photosensitive material 21 such as a photopolymer or a silver halide material is located on, and away from, the master plate of CGH 1 side at the time of recording the obtained H1 hologram 11, and the second reconstructing illumination light 5 that travels in the direction opposite to the first reference light 4 upon holographic recording is entered on the H1 hologram 11 from the opposite side to the incidence of the first reference light 4 upon holographic recording. In this case, it is preferable to prevent the zero-order light of the second reconstructing illumination light 5 from overlapping the H2 hologram recording photosensitive material 21, because noises are reduced.

Thereupon, the second diffracted light 6 is generated from the H1 hologram 11, and that second diffracted light 6 and the second reference light 7 that is coherent with the second diffracted light 6 and comprises parallel light from the same light source are simultaneously entered at a given angle of incidence on the surface of the H2 hologram recording photosensitive material 21 to expose a hologram of the second reconstruction image O" to the H2 hologram recording photosensitive material 21. In this case, when the H2 hologram 21 is configured as the transmission type, the second reference light 7 is entered from the same side as the second diffracted light 6, and when the H2 hologram 21 is configured as the reflection type, the second reference light 7 is entered from the opposite side to the second diffracted light 6. Finally, the H2 hologram recording photosensitive material 21 with the hologram exposed to light is post-processed into the H2 hologram 21. Note here that the H2 hologram recording photosensitive material and the H2 hologram are indicated by the same reference numeral 21.

Figure 6:
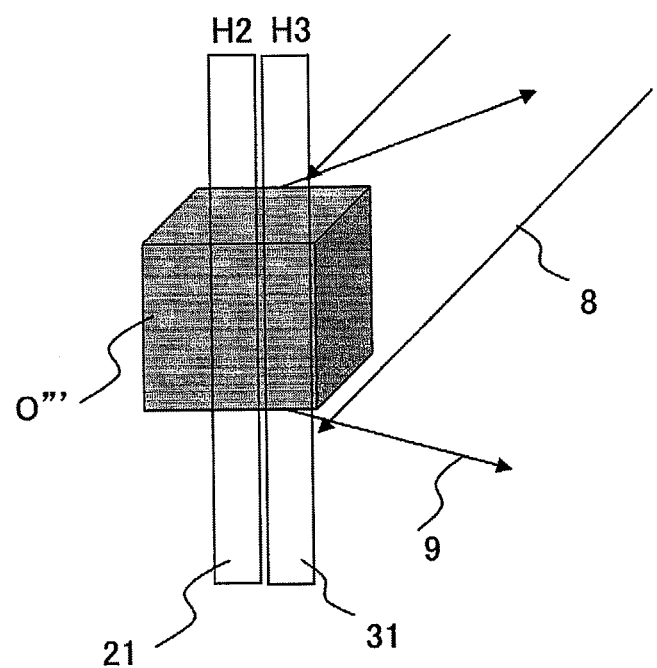
FIG. 6 is illustrative of the arrangement of replicating a reflection type H3 hologram.

FIG. 6 is illustrative of a holographic recording arrangement for replicating an H3 hologram 31 from the thus fabricated reflection type H2 hologram 21 with the same properties. As shown in FIG. 6, a volume type H3 hologram photosensitive material 31 is located in close contact with the H2 hologram 21 comprising the volume type reflection hologram, optionally via an index-matching liquid between them. Then, the third reconstructing illumination light 8 that travels in the opposite direction to the second reference light 7 at the time of fabricating the H2 hologram of FIG. 4(b) is entered on the H2 hologram 21 from the H3 hologram photosensitive material 31 side and from the opposite side to the incidence of the second reference light 7 at the time of fabricating the H2 hologram. Finally, by interference in the H3 hologram photosensitive material 31 of the third reconstructing illumination light 8 incident on the H3 hologram photosensitive material 31 and the diffracted light 9 (that travels in the opposite direction to the second diffracted light 6) from the H2 hologram 21, the H2 hologram 21 is replicated as the H3 hologram 31 in the H3 hologram photosensitive material 31.

Figure 7:
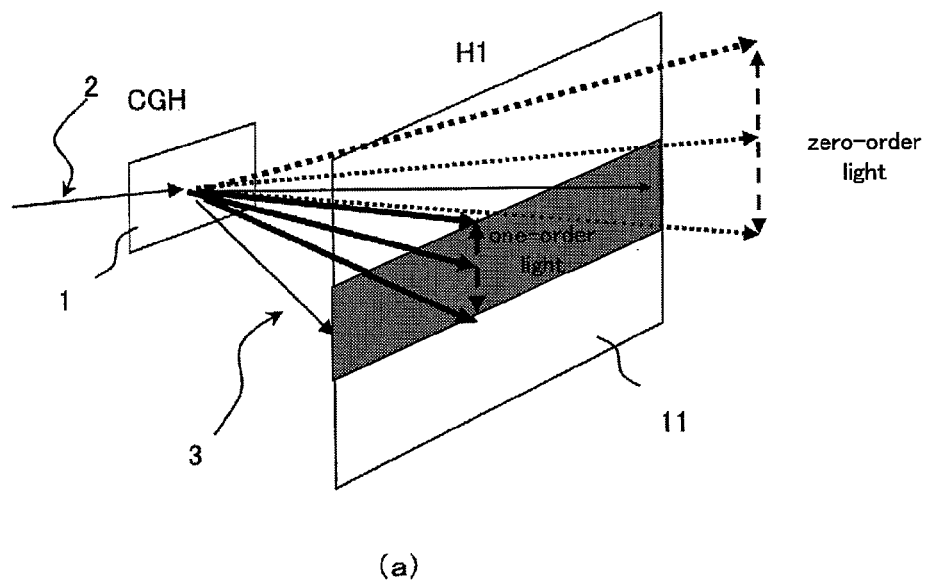
FIG. 7 is illustrative of comparisons of the master plate of CGH in the first embodiment depending on the direction of incidence of the first reconstructing illumination light.
Figure 7:
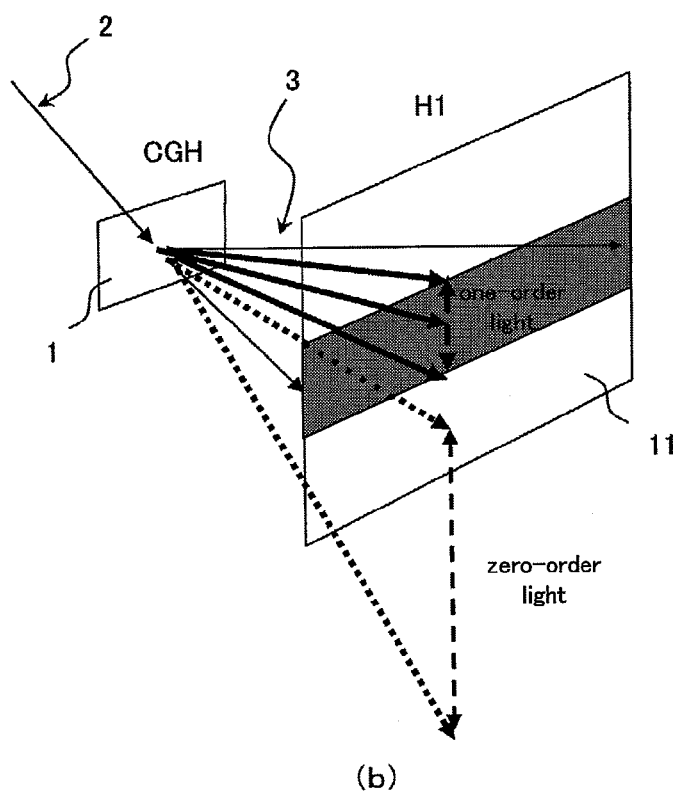

The direction of incidence of the first reconstructing illumination light 2 on the master plate of CGH 1 of the invention is now explained. FIG. 7 is illustrative of comparisons of the master plate of CGH 1 depending on the direction of incidence of the first reconstructing illumination light 2. In FIG. 7(a), the first reconstructing illumination light 2 is supposed to enter the master plate of CGH 1 in an obliquely horizontal direction in which the object light spreads out at the time of recording the master plate of CGH 1, and in FIG. 7(b), the first reconstructing illumination light 2 is supposed to enter the CGH1 in an obliquely vertical direction.

Referring to the obliquely vertical incidence of the first reconstructing illumination light 2, as shown in FIG. 7(b), both the diffraction of the light 2 through the master plate of CGH 1 and the diffusion of the light 2 occur in the vertical direction; as the angle of diffusion of the light 2 grows wider, it causes the zero-order light to diffuse in the vertical direction, too, and enter the effective area of the H1 hologram recording photosensitive material 11, which may otherwise cause noises.

Referring to the incidence of the first reconstructing illumination light 2 in the obliquely horizontal direction that is the one-dimensional direction in which the object light spreads out at the time of holographic recording, by contrast, the diffraction of the light 2 through the master plate of CGH 1 occurs in the horizontal direction and the diffusion of the light 2 occurs in the vertical direction as shown in FIG. 7(a), so that even when the angle of diffusion of the light 2 grows wider, the zero-order light will diffuse outside the effective area of the H1 hologram recording photosensitive material 11 and in the vertical direction or it will not enter the effective area of the H1 hologram recording photosensitive material 11. Accordingly, the first reconstructing illumination light 2 is preferably incident on the master plate of CGH 1 in the obliquely horizontal direction.

The volume hologram according to the example here may be fabricated using as the master plate of CGH 1a computer-generated hologram capable of reconstructing a full-color image under while light (see Patent Publication 1) or two or more wavelengths. At the time of fabricating the H1 hologram 11 shown in FIG. 4(a), the wavelength of the first reconstructing illumination light 2 is varied in order and the H1 hologram recording photosensitive material 11 is changed into another corresponding one to fabricate a plurality of H1 holograms 11r, 11g, 11b corresponding to the respective RGB wavelengths. At the time of fabricating the H2 hologram 21 shown in FIG. 4(b), while the H1 holograms 11r, 11g, 11b are interchanged in order, the second reconstructing illumination light 5 is entered in them, so that the holograms corresponding to the RGB wavelengths are multi-recorded in the H2 hologram recording photosensitive material 21 in a single layer form or the holograms corresponding to the RGB wavelengths are recorded in the separate H2 hologram recording photosensitive materials 21 corresponding to the RGB wavelengths. In the latter case, the H2 hologram recording photosensitive materials corresponding to the RGB wavelengths are coated on a transparent substrate in order, and the H1 holograms of the RGB wavelengths are put one upon another for exposure to light. By this process, it is possible to enhance a lot more the security and design of the volume hologram having the reconstruction image of the computer-generated hologram recorded in it according to the invention.

Figure 8:
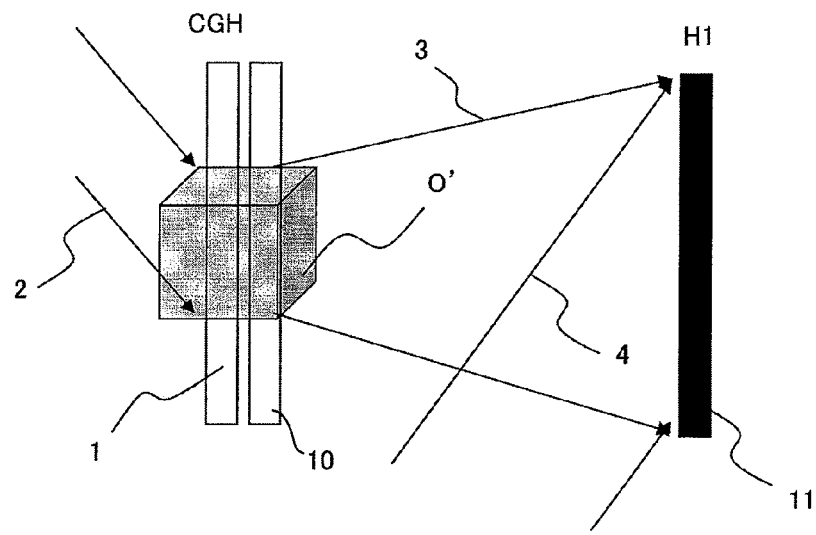
FIG. 8 is illustrative of the second embodiment of how to fabricate a volume hologram based on the invention.
Figure 8:
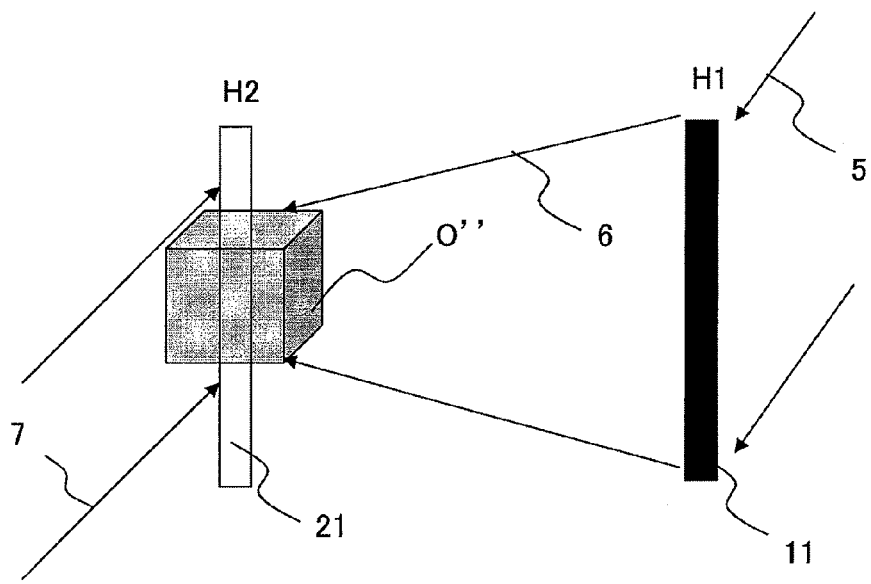

The second process embodiment for the fabrication of the volume hologram from the obtained mater CGH 1 is now explained. That is, the second embodiment shown in FIG. 8 is explained. FIG. 8(a) is illustrative of a holographic recording arrangement for fabricating the first-stage H1 hologram 11 from the master plate of CGH 1, and FIG. 8(b) is illustrative of a holographic recording arrangement for fabricating the second-stage H2 hologram 21 from the first-stage H1 hologram 11.

As shown in FIG. 8(a), the H1 hologram recording photosensitive material 11 such as a photopolymer or a silver halide material is located facing to the master plate of CGH 1. Then, the master plate of CGH 1 is irradiated with the first reconstructing illumination light 2 to generate the first diffracted light 3 to form the first reconstruction image O' of the original image O, and the first diffracted light 3 is entered on the H1 hologram recording photosensitive material 11. Then, that first diffracted light 3 and the first reference light 4 that is coherent with the first diffracted light 3 and comprises parallel light from the same light source are simultaneously entered at an angle of incidence θ on the surface of the H1 hologram recording photosensitive material 11 to expose a hologram of the first reconstruction image O' to the H1 hologram recording photosensitive material 11. In this case, it is preferable to prevent the zero-order light of the first reconstructing illumination light 2 from overlapping the H1 hologram recording photosensitive material 11, because noises are reduced. Finally, the H1 hologram recording photosensitive material 11 with the hologram exposed to light is post treated to fabricate the H1 hologram 11. Here, the H1 hologram recording photosensitive material and the H1 hologram are indicated by the same reference numeral 11.

In the computer-generated hologram fabricated here and shown in FIGS. 1, 2 and 3, a horizontal visual area in the one-dimensional direction in which light from the point light source spreads out at the time of holographic recording is narrower than a vertical visual area orthogonal to that one-dimensional direction. For this reason, a unidirectional diffuser 10 acting as a unidirectional diffusion means for diffusing light in the one-dimensional direction only, for instance, a lenticular sheet or a hologram, is located near a position where the image o' of the original image O is formed to diffuse the diffracted light 4 in the vertical direction.

Then, as shown in FIG. 4(b), the H2 hologram recording photosensitive material 21 such as a photopolymer or a silver halide material is located facing to the obtained H1 hologram 11, and the second reconstructing illumination light 5 that travels in the direction opposite to the first reference light 4 upon holographic recording is entered on the H1 hologram 11 from the opposite side to the incidence of the first reference light 4 upon holographic recording. In this case, it is preferable to prevent the zero-order light of the second reconstructing illumination light 5 from entering the H2 hologram recording photosensitive material 21, because noises are reduced.

Thereupon, the second diffracted light 6 is generated from the H1 hologram 11, and that second diffracted light 6 and the second reference light 7 that is coherent with the second diffracted light 6 and comprises parallel light from the same light source are simultaneously entered at a given angle of incidence on the surface of the H2 hologram recording photosensitive material 21 to expose a hologram of the second reconstruction image O'' to the H2 hologram recording photosensitive material 21. In this case, when the H2 hologram 21 is configured as the transmission type, the second reference light 7 is entered from the same side as the second diffracted light 6, and when the H2 hologram 21 is configured as the reflection type, the second reference light 7 is entered from the opposite side to the second diffracted light 6. Finally, the H2 hologram recording photosensitive material 21 with the hologram exposed to light is post-processed into the H2 hologram 21. Note here that the H2 hologram recording photosensitive material and the H2 hologram are indicated by the same reference numeral 21.

In the second embodiment, too, the H2 hologram 21 may be replicated as an H3 hologram 31 in an H3 hologram recording photosensitive material 31 in the same way as is the case with the first embodiment shown in FIG. 6.

Figure 9A:
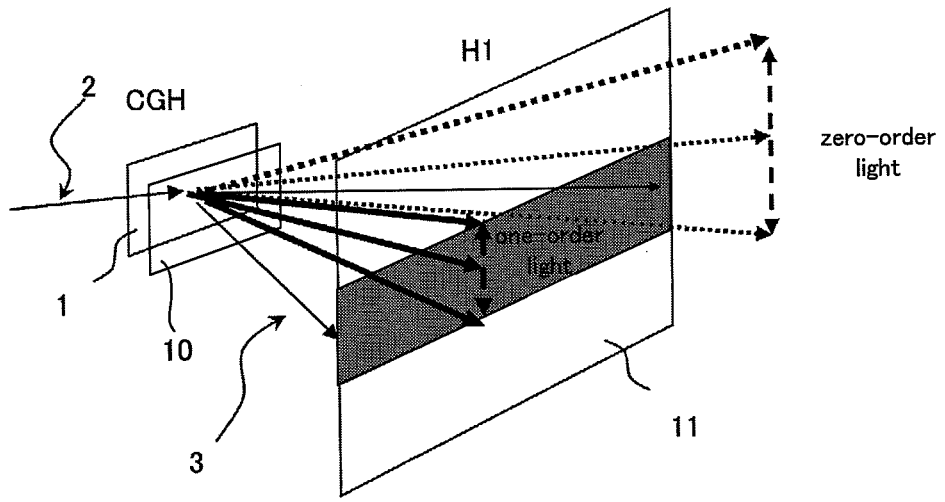
FIG. 9 is illustrative of comparisons of the master plate of CGH in the second embodiment depending on the direction of incidence of the first reconstructing illumination light.
Figure 9B:
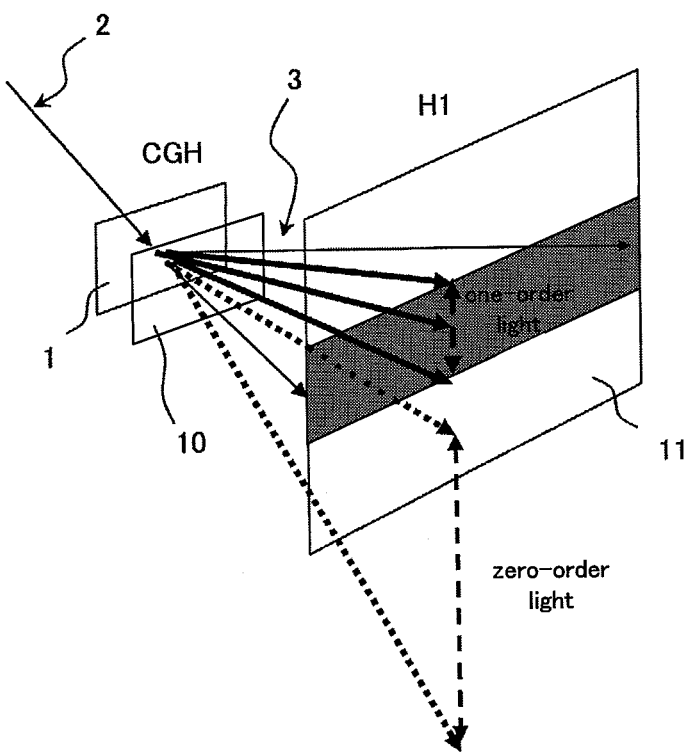

The direction of incidence of the first reconstructing illumination light 2 on the master plate of CGH 1 in the embodiment here is now explained. FIG. 9 is illustrative of comparisons of the master plate of CGH 1 depending on the direction of incidence of the first reconstructing illumination light 2. In FIG. 9(a), the first reconstructing illumination light 2 is supposed to enter the master plate of CGH 1 in an obliquely horizontal direction in which the object light spreads out at the time of recording the master plate of CGH 1, and in FIG. 9(b), the first reconstructing illumination light 2 is supposed to enter the CGH 1 in an obliquely vertical direction.

Referring to the obliquely vertical incidence of the first reconstructing illumination light 2, as shown in FIG. 9(b), both the diffraction of the light 2 through the master plate of CGH 1 and the diffusion of the light 2 through the unidirectional diffuser 10 occur in the vertical direction; as the angle of diffusion of the light 2 grows wider through the unidirectional diffuser 10, it causes the zero-order light to diffuse in the vertical direction, and enter the effective area of the H1 hologram recording photosensitive material 11, which may otherwise cause noises.

Referring to the incidence of the first reconstructing illumination light 2 in the obliquely horizontal direction that is the one-dimensional direction in which the object light from the point light source spreads out at the time of holographic recording, by contrast, the diffraction of the light 2 through the master plate of CGH 1 occurs in the horizontal direction and the diffusion of the light 2 through the unidirectional diffuser 10 occurs in the vertical direction as shown in FIG. 9(a), so that even when the angle of diffusion of the light 2 grows wider, the zero-order light will diffuse outside the effective area of the H1 hologram recording photosensitive material 11 and in the vertical direction or it will not enter the effective area of the H1 hologram recording photosensitive material 11. Accordingly, the first reconstructing illumination light 2 is preferably incident on the master plate of CGH 1 in the obliquely horizontal direction.

Figure 10A:
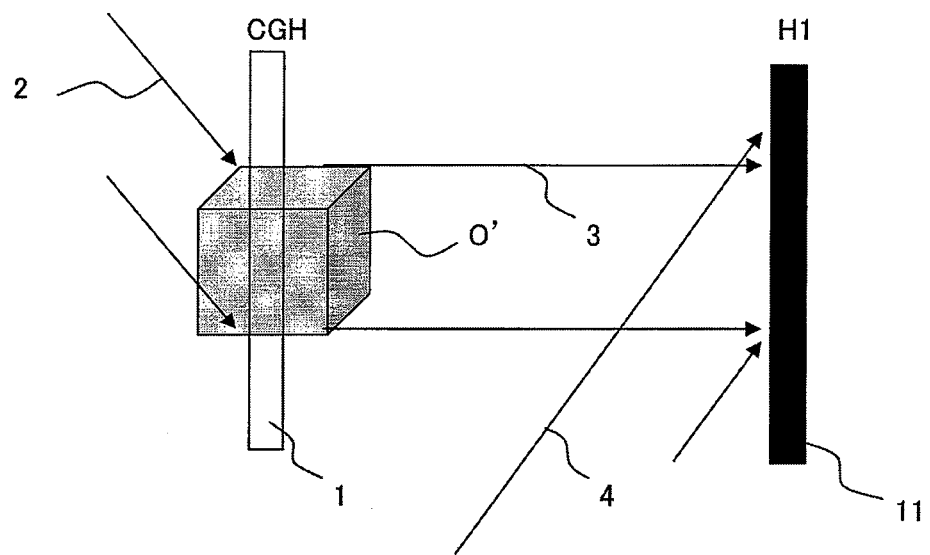
FIG. 10 is illustrative of the third embodiment of how to fabricate a volume hologram based on the invention.
Figure 10B:
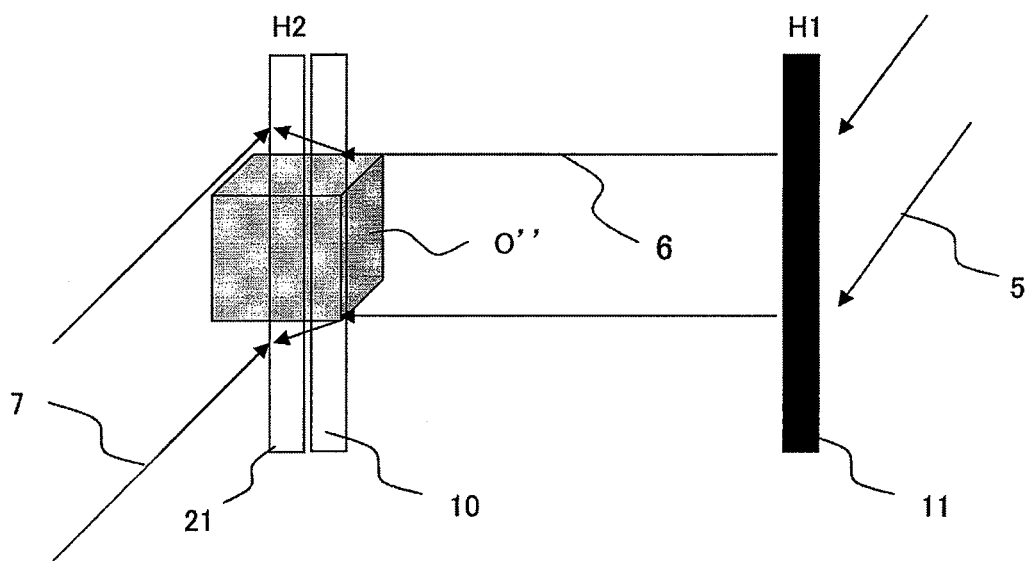

The third embodiment shown in FIG. 10 is now explained. FIG. 10(a) is illustrative of a holographic recording arrangement for fabricating the first-stage H1 hologram 11 from the master plate of CGH 1, and FIG. 10(b) is illustrative of a holographic recording arrangement for fabricating the second-stage H2 hologram 21 from the first-stage H1 hologram 11.

As shown in FIG. 10(a), the H1 hologram recording photosensitive material 11 such as a photopolymer or a silver halide material is located facing to the master plate of CGH 1. Then, the master plate of CGH 1 is irradiated with the first reconstructing illumination light 2 to generate the first diffracted light 3 to form the first reconstruction image O' of the original image O, and the first diffracted light 3 is entered on the H1 hologram recording photosensitive material 11. Then, that first diffracted light 3 and the first reference light 4 that is coherent with the first diffracted light 3 and comprises parallel light from the same light source are simultaneously entered at an angle of incidence θ on the surface of the H1 hologram recording photosensitive material 11 to expose a hologram of the first reconstruction image O' to the H1 hologram recording photosensitive material 11. In this case, it is preferable to prevent the zero-order light of the first reconstructing illumination light 2 from overlapping the H1 hologram recording photosensitive material 11, because noises are reduced. Finally, the H1 hologram recording photosensitive material 11 with the hologram exposed to light is post-processed into the H1 hologram 11. Here, the H1 hologram recording photosensitive material and the H1 hologram are indicated by the same reference numeral 11.

Then, as shown in FIG. 10(b), the second reconstructing illumination light 5 that travels in the direction opposite to the first reference light 4 upon holographic recording is entered on the obtained H1 hologram 11 from the opposite side to the incidence of the first reference light 4 upon holographic recording. In this case, it is preferable to prevent the zero-order light of the second reconstructing illumination light 5 from overlapping the H2 hologram recording photosensitive material 21, because noises are reduced.

Thereupon, the second diffracted light 6 is generated from the H1 hologram 11, so that the second reconstruction image O'' of the reconstructed image O' is reconstructed and formed at the same position of the surface of the H1 hologram 11 as the relative position of the reconstructed image O' at the time of holographic recording.

In the computer-generated hologram shown in FIGS. 1, 2 and 3, a horizontal visual area in the one-dimensional direction in which light from the point light source spreads out at the time of holographic recording is narrower than a vertical visual area orthogonal to that one-dimensional direction. For this reason, a unidirectional diffuser 10 acting as a unidirectional diffusion means, for instance, such a lenticular sheet or hologram as shown in FIG. 5, is located near a position where the second reconstruction image O'' of the original image O is formed to diffuse the second diffracted light 6 in the vertical direction. Thus, by the location of the unidirectional diffuser 10, the second diffracted light 6 is diffused in the vertical direction, thereby making the vertical visual area wider.

The H2 hologram recording photosensitive material 21 comprising a photopolymer, a silver halide material or the like is located just near the unidirectional diffuser 10, and the second reference light 7 that is coherent with the second diffracted light 6 and comprises parallel light from the same light source are simultaneously entered at a given angle of incidence and exposed in the H2 hologram recording photosensitive material 21. In this case, when the H2 hologram 21 is configured as the transmission type, the second reference light 7 is entered from the same side as the second diffracted light 6, and when the H2 hologram 21 is configured as the reflection type, the second reference light 7 is entered from the opposite side to the second diffracted light 6. Finally, the H2 hologram recording photosensitive material 21 with the hologram exposed to light is post-processed into the H2 hologram 21. Note here that the H2 hologram recording photosensitive material and the H2 hologram are indicated by the same reference numeral 21.

In the third embodiment, too, the H2 hologram 21 may be replicated as an H3 hologram 31 in an H3 hologram recording photosensitive material 31 in the same way as is the case with the first embodiment shown in FIG. 6.

The volume hologram of the second, and the third embodiment, too, may be fabricated using as the master plate of CGH 1 a computer-generated hologram capable of reconstructing a full-color image under while light (see Patent Publication 1) or two or more wavelengths. At the time of fabricating the H1 hologram 11 shown in FIGS. 8(a), and 10(a), the wavelength of the first reconstructing illumination light 2 is varied in order and the H1 hologram recording photosensitive material 11 is turned into another corresponding one to fabricate a plurality of H1 holograms 11r, 11g, 11b corresponding to the respective RGB wavelengths. At the time of fabricating the H2 hologram 21 shown in FIGS. 8(b), and 10(b), while the H1 holograms 11r, 11g, 11b are interchanged in order, the second reconstructing illumination light 5 is entered in them, so that the holograms corresponding to the RGB wavelengths are multi-recorded in the H2 hologram recording photosensitive material 21 in a single layer form or the holograms corresponding to the RGB wavelengths are recorded in the separate H2 hologram recording photosensitive materials 21 corresponding to the RGB wavelengths. It is thus possible to enhance more the security and design of the volume hologram.

Figure 11:
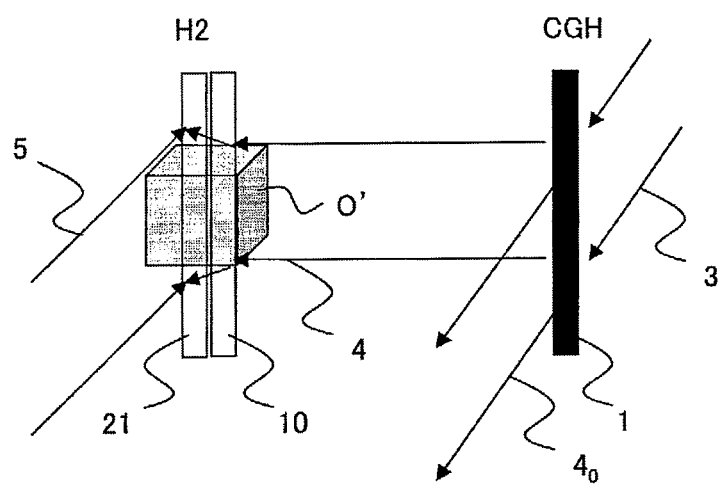
FIG. 11 is illustrative of the fourth embodiment of how to fabricate a volume hologram based on the invention.
Figure 12:
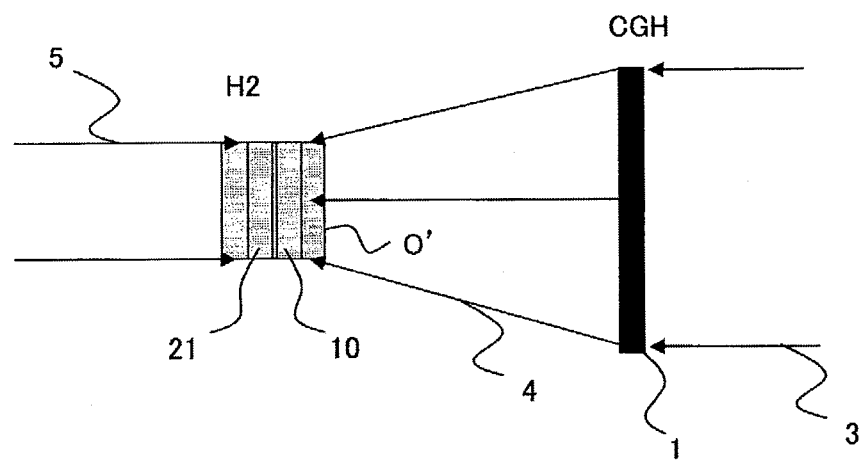
FIG. 12 is a top view of the fourth embodiment.

The fourth process embodiment for fabricating a volume hologram from the master plate of CGH 1 that is the obtained computer-generated hologram is now explained. In the fourth embodiment, the reconstructing illumination light 3 is entered in the obtained master plate of CGH 1 from the side opposite to the location of the H2 hologram recording photosensitive material 21, as shown in FIGS. 11 and 12. In this case, it is preferable to prevent the zero-order light $4_0$ of the reconstructing illumination light 3 from entering the H2 hologram recording photosensitive material 21, because noises are reduced. Upon entrance of the reconstructing illumination light 3 in the master plate of CGH 1, the diffracted light 4 is generated from the master plate of CGH 1 so that the reconstruction image O' of the original image O is reconstructed and formed at the same position as the relative position of the original image O at the time when it is recorded facing away from the surface of the master plate of CGH 1. In this case, the diffracted light 4 from the master plate of CGH 1 converges only in the horizontal direction that has a visual area directing to the imaged position of the reconstruction image O', as shown in FIG. 12, so that the intensity of the object light can be enhanced.

In the computer-generated hologram shown in FIGS. 1, 2 and 3, the horizontal visual area in the one-dimensional direction in which the object light from the point light source spreads out at the holographic recording time is narrower than the vertical visual area orthogonal to that one-dimensional direction. For this reason, a unidirectional diffuser 10 acting as a unidirectional diffusion means, for instance, such a lenticular sheet or hologram as shown in FIG. 5, is located near a position where the second reconstruction image O' of the original image O is formed to diffuse the diffracted light 4 in the vertical direction.

Then, the H2 hologram recording photosensitive material 21 comprising a photopolymer, a silver halide material or the like is located just near the unidirectional diffuser 10 and the reconstruction image O', and the reference light 5 that is coherent with the reconstructing reference light 3 and comprises parallel light from the same light source is simultaneously entered at any desired angle of incidence from the same or opposite side to expose the H2 hologram in the H2 hologram recording photosensitive material 21.

Figure 13A:
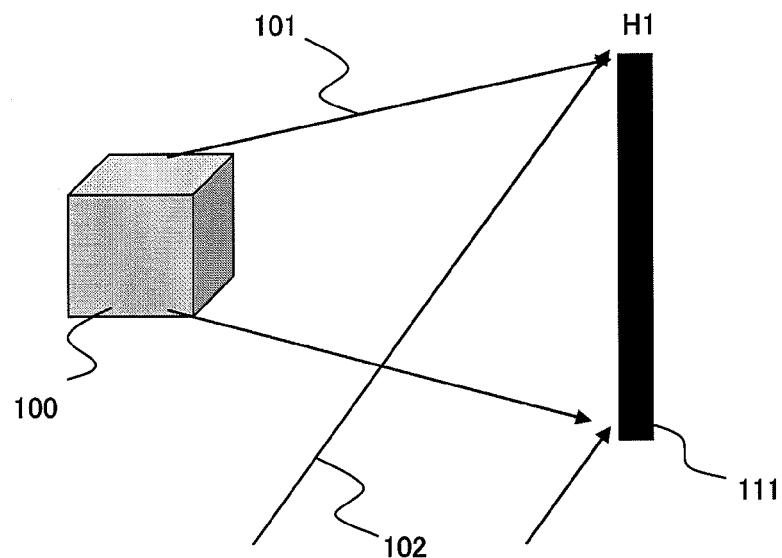
FIG. 13 is illustrative of the prior art.

For the purpose of comparisons, a two-step process that is one conventional volume hologram fabrication process is here explained. FIG. 13 is illustrative of the fabrication of a hologram by the conventional two-step process: (a) is a side view of a holographic recording arrangement for the first-stage H1 hologram and (b) is a side view of a holographic recording arrangement for the second-stage H2 hologram. First, the H1 hologram recording photosensitive material 111 such as a photopolymer or a silver halide material is located facing to the object (shown here in a cubic form) 100 to be holographically recorded, as shown in FIG. 13(a). Then, the object 100 is illuminated with laser light having a given wavelength so that the object light 101 scattered by the object 100 is entered in the H1 hologram recording photosensitive material 111, and the reference light 102 that is coherent with the object light 100 and comprises parallel light from the same light source is simultaneously entered at an angle of incidence θ on the surface of the H1 hologram recording photosensitive material 111 to expose a hologram of the object 100 to the H1 hologram recording photosensitive material 111. Finally, the H1 hologram recording photosensitive material 111 with that hologram exposed to light is post-processed into the H1 hologram 111. Note here that the H1 hologram recording photosensitive material and the H1 hologram are indicated by the same reference numeral 111.

Figure 13B:
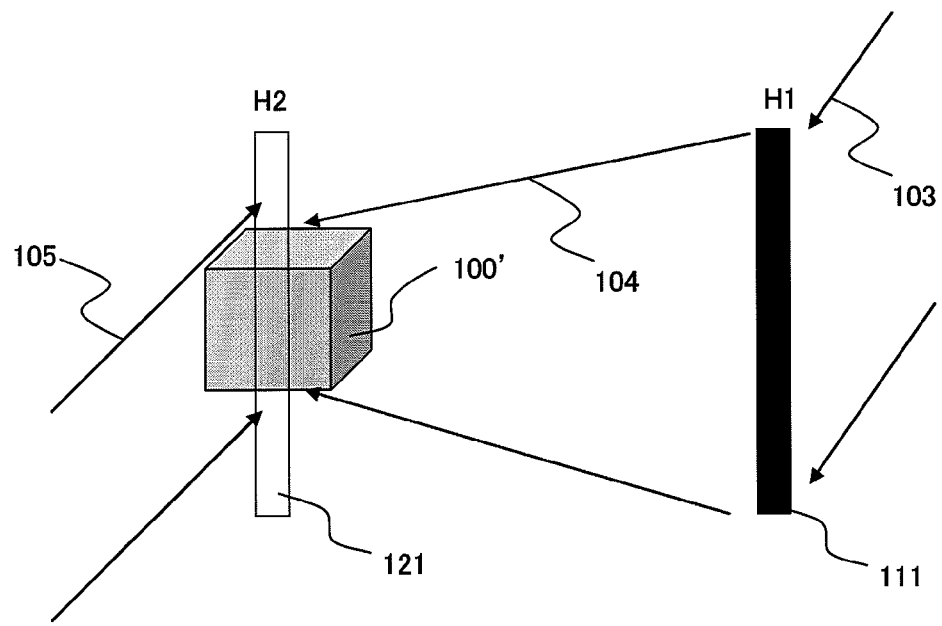

Then, the reconstructing illumination light 103 that travels in the opposite direction to the reference light 102 at the holographic recording time is entered in the obtained H1 hologram 111 from the opposite side to the side on which the reference light 102 is incident at the holographic recording time, as shown in FIG. 13(b). Thereupon, the diffracted light 104 is generated from the H1 hologram 111 so that the image 100' of the object 100 is reconstructed and formed on the surface of the H1 hologram 111 at the same position as the relative position of the object 100 at the holographic recording time. The second-stage H2 hologram recording photosensitive material 121 comprising a photopolymer, a silver halide material or the like is located near the position at which the image 100' of the object 100 is formed, and the reference light 105 that is coherent with the reconstructing illumination light 103 and comprises parallel light from the same light source is simultaneously entered at any desired angle of incidence from the same side as or the opposite side to the diffracted light 104 to expose the second-stage H2 hologram in the H2 hologram recording photosensitive material 121. Finally, the H2 hologram recording photosensitive material 121 with the second-stage H2 hologram exposed to light is post-processed into the H2 hologram 121. Note here that the H2 hologram recording photosensitive material and the H2 hologram are indicated by the same reference numeral 121.

The thus recorded H1 hologram 121 is a volume hologram: it is recorded as a reflection type hologram upon incidence of the reference light 105 from the opposite side to the diffracted light 104, and as a transmission type hologram upon incidence of the reference light 105 from the same side as the diffracted light 104.

As compared with the prior art two-step hologram fabrication process, the process embodiment according to the invention, because of using the master plate of CGH 1, makes it possible to reduce the steps of fabricating the conventional H1 hologram 111 when fabricating the volume hologram 21 corresponding to the H2 hologram. It is also possible to fabricate holograms by a simple process without recourse to any real object. Further, it is possible to fabricate the original image on a computer and, hence, a hologram of minute structure with enhanced security and improved design.

In the fourth embodiment, too, the H2 hologram 21 may be replicated as an H3 hologram 31 in an H3 hologram recording photosensitive material 31 in the same way as is the case with the first embodiment shown in FIG. 6.

The volume hologram of the fourth embodiment may be fabricated using as the master plate of CGH 1 a computer-generated hologram capable of reconstructing a full-color image under while light (see Patent Publication 1) or two or more wavelengths. The wavelength of the reconstructing illumination light 2 is varied in order and multi-recorded in the H2 hologram recording photosensitive material 21 in a single layer form, or a plurality of hologram layers having different wavelengths recorded in separate H1 hologram recording photosensitive materials 21 every time the wavelength of the reconstructing illumination light is varied are integrally put one upon another. It is thus possible to extend design a lot more.

While the inventive hologram fabrication process and the hologram fabricated by that process have been described with reference to some embodiments, it is understood that the invention is never limited to them: it may be modified, varied, or changed in various forms.

INDUSTRIAL APPLICABILITY

With the inventive hologram fabrication process and the hologram fabricated by that process, it is possible to fabricate volume holograms through a simplified process, which is much more improved in terms of security and design.

What is claimed is:

1. A hologram fabrication method, characterized by comprising steps of fabricating a computer-generated hologram having amplitude information and phase information recorded by computer operation on a given recording surface, irradiating said computer-generated hologram with first reconstructing illumination light to generate first diffracted light from said computer-generated hologram thereby reconstructing a first reconstruction image, simultaneously entering said first diffracted light and first reference light in a first-stage hologram recording material faced away from said first reconstructed image to record a first-stage hologram in it, irradiating the recorded first-stage hologram with second reconstructing illumination light to generate second diffracted light from said first-stage hologram thereby reconstructing a second reconstruction image, and simultaneously entering said second diffracted light and second reference light in a second-stage hologram recording material located near said second reconstructed image to record a second-stage hologram in it as a reflection or transmission type volume hologram, wherein a computer-generated hologram recorded by use of object light that spreads out from a point light source set on a recording object in a given one-dimensional direction only is used as said computer-generated hologram, and when recording said first-stage hologram, diffusing illumination light that diffuses only in a direction orthogonal to said one-dimensional direction is used as said first reconstructing illumination light.

2. The hologram fabrication process according to claim 1, characterized in that said first-stage hologram recording material is located such that zero-order light of said first reconstructing illumination light is not incident to it or, alternatively, said second-stage hologram recording material is located such that zero-order light of said second reconstructing illumination light is not incident to it.

3. The hologram fabrication process according to claim 1, characterized in that said first reconstructing illumination light, with which said computer-generated hologram is irradiated, comes in from said one-dimensional direction.

4. The hologram fabrication process according to claim 1, characterized in that a computer-generated hologram fabricated by use of object light that spreads out from a point light source set on a recording object in a given one-dimensional direction only is used as said computer-generated hologram, and when recording said first-stage hologram, a unidirectional diffusing means for diffusing light in only a direction orthogonal to said one-dimensional direction is located near said computer-generated hologram on said first-stage hologram recording material side.

5. The hologram fabrication process according to claim 1, characterized in that a computer-generated hologram fabricated by use of object light that spreads out from a point light source set on a recording object in a given one-dimensional direction only is used as said computer-generated hologram, and when recording said second-stage hologram, a unidirectional diffusing means for diffusing light in only a direction orthogonal to said one-dimensional direction is located near said second-stage hologram on said first-stage hologram recording material side.

6. The hologram fabrication process according to claim 1, characterized in that a computer-generated hologram capable of reconstructing a full-color image under white light is used as said computer-generated hologram; a wavelength of said first reconstructing illumination light is varied in order when fabricating said first-stage hologram so that a plurality of first-stage holograms are fabricated corresponding to the respective wavelengths; when fabricating said second-stage hologram, the plurality of first-stage holograms corresponding to the respective wavelengths are interchanged and irradiated with the second reconstructing illumination light having corresponding wavelengths so that the holograms corresponding to the respective wavelengths are multi-recorded in a second-stage hologram recording photosensitive material in a one layer form, or the holograms corresponding to the respective wavelengths are recorded in a second-stage hologram recording photosensitive material in separate layers form corresponding to the respective wavelengths.

7. A hologram, characterized by being fabricated by the hologram fabrication process as recited in claim 1.

* * * * *